United States Patent
Garver et al.

(10) Patent No.: US 6,776,056 B2
(45) Date of Patent: Aug. 17, 2004

(54) SEAT BELT TENSION SENSOR (75) Inventors: Ryan Garver, Osceola, IN (US);
Murray Kaijala, Elkhart, IN (US);
Dale Teeters, South Bend, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 10/185,242

(22) Filed: Jun. 28, 2002

(65) Prior Publication Data

US 2003/0024327 A1 Feb. 6, 2003

Related U.S. Application Data (63) Continuation-in-part of application No. 09/923,151, filed on Aug. 6, 2001.

(51) Int. Cl.[7] .................................................. G01L 1/00
(52) U.S. Cl. ........................................................ 73/862
(58) Field of Search ........................... 73/160, 862.391, 73/862, 826; 280/804, 735, 801.1; 180/268; 701/45, 862.451, 862.453, 862.474, 862.391, 862.452

(56) References Cited

U.S. PATENT DOCUMENTS

| | | | | |
|---|---|---|---|---|
| 5,026,093 A | * | 6/1991 | Nishikaji | 280/807 |
| 5,044,459 A | * | 9/1991 | Nishikaji | 180/268 |
| 5,181,739 A | | 1/1993 | Bauer | 280/807 |
| 5,244,231 A | | 9/1993 | Bauer | 280/807 |
| 5,765,774 A | | 6/1998 | Maekawa | 242/390.9 |
| 5,960,523 A | | 10/1999 | Husby | 24/633 |
| 5,995,827 A | | 10/1999 | Stanley | 73/862.391 |
| 5,996,421 A | * | 12/1999 | Husby | 73/862.451 |
| 6,081,759 A | | 6/2000 | Husby | 701/45 |
| 6,151,540 A | | 11/2000 | Anishetty | 701/45 |
| 6,161,439 A | | 12/2000 | Stanley | 73/862.391 |
| 6,205,868 B1 | | 3/2001 | Miller | 73/862.391 |
| 6,209,915 B1 | * | 4/2001 | Blakesley | 280/801.1 |
| 6,230,088 B1 | * | 5/2001 | Husby | 701/45 |
| 6,264,236 B1 | | 7/2001 | Hiroshi | 280/735 |
| 6,264,281 B1 | | 7/2001 | Dukatz | 297/480 |
| 6,301,977 B1 | | 10/2001 | Stojanovski | 73/862.393 |
| 6,336,371 B1 | | 1/2002 | O'Boyle | 73/865.9 |
| 6,356,200 B1 | * | 3/2002 | Hamada et al. | 340/667 |
| 6,363,793 B2 | * | 4/2002 | OBoyle | 73/828 |
| 6,364,532 B1 | * | 4/2002 | Norton | 280/735 |
| 6,400,145 B1 | * | 6/2002 | Chamings et al. | 324/207.26 |
| 6,520,540 B1 | * | 2/2003 | Siegfried et al. | 280/801.1 |
| 2001/0042981 A1 | | 11/2001 | Kohut | |
| 2001/0054323 A1 | | 12/2001 | Faigle | |

FOREIGN PATENT DOCUMENTS

WO    WO99/12012    3/1999

* cited by examiner

*Primary Examiner*—Edward Lefkowitz
*Assistant Examiner*—Octavia Davis
(74) *Attorney, Agent, or Firm*—Steve D. Weseman; Mark P. Bourgeois (57) ABSTRACT

A seat belt tension sensor for measuring the magnitude of tension in a seat belt. The seat belt tension sensor has a housing with a cavity. An anchor plate has a portion located in the cavity. The housing moves relative to the anchor plate between a first position and a second position. A sensor is mounted to the housing. The housing presses on the sensor as the housing moves from the first to the second position. The sensor generates an electrical signal in response to the housing moving between the first and second positions. The electrical signal changes as a function of tension on the seat belt. The sensor is a strain gage. The housing engages the anchor plate in the second position to protect the sensor from damage in a vehicle crash situation.

37 Claims, 7 Drawing Sheets

SEAT BELT TENSION SENSOR

CROSS REFERENCE TO RELATED AND CO-PENDING APPLICATIONS

This application is a continuation in part of U.S. patent application Ser. No. 09/923,151 filed Aug. 6, 2001 and titled, "Seat Belt Tension Sensor".

This application is related to the following U.S. patent applications:

U.S. patent application Ser. No. 09/884,615 filed Jun. 19, 2001 and titled, "Seat Belt Tension Sensor with Overload Protection".

U.S. patent application Ser. No. 09/441,350, filed Nov. 15, 1999 and titled, "Automobile Seat Having Seat Supporting Brackets with a Stepped Weight Sensor".

U.S. patent application Ser. No. 09/374,874, filed Aug. 16, 1999 and titled, "Automobile Seat Weight Sensor".

U.S. patent application Ser. No. 09/374,870, filed Aug. 16, 1999 and titled, "Vehicle Occupant Position Detector and Airbag Control System".

U.S. patent application Ser. No. 09/422,382, filed Oct. 21, 1999 and titled, "Vehicle Seat Weight Sensor".

U.S. Pat. No. 6,209,915, issued Apr. 3, 2001 and titled, "Seat Belt Tension Sensor".

The foregoing patents have the same assignee as the instant application and are herein incorporated by reference in their entirety for related and supportive teachings.

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person. For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average-sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules under FMVSS 208 requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY

It is a feature of the present invention to provide a seat belt tension sensor for attachment between a seat belt and a vehicle.

Another feature of the invention is to provide a seat belt tension sensor that includes a housing that has a cavity. An anchor plate has a first portion located in the cavity. The housing moves relative to the anchor plate between a first position and a second position. A sensor is mounted to the housing. The housing presses on the sensor as the housing moves from the first to the second position. The sensor generates an electrical signal in response to the housing moving between the first and second positions. The electrical signal changes as a function of the tension on the seat belt. A spring is located between the sensor and the anchor plate.

It is noted that the drawings of the invention are not to scale.

DETAILED DESCRIPTION

The present invention is a seat belt tension sensor. Referring to FIGS. 1–8, a seat belt tension sensor assembly 20 shown. Assembly 20 has a limit structure 22 and a sensor 24. Limit structure 22 is fastened between a seat belt webbing 30 and a structural part of the vehicle such as a floor (not shown). The belt webbing 30 has an end 31, an end 32, a belt loop 33 and stitching 34 that retains end 32.

Figure 1:
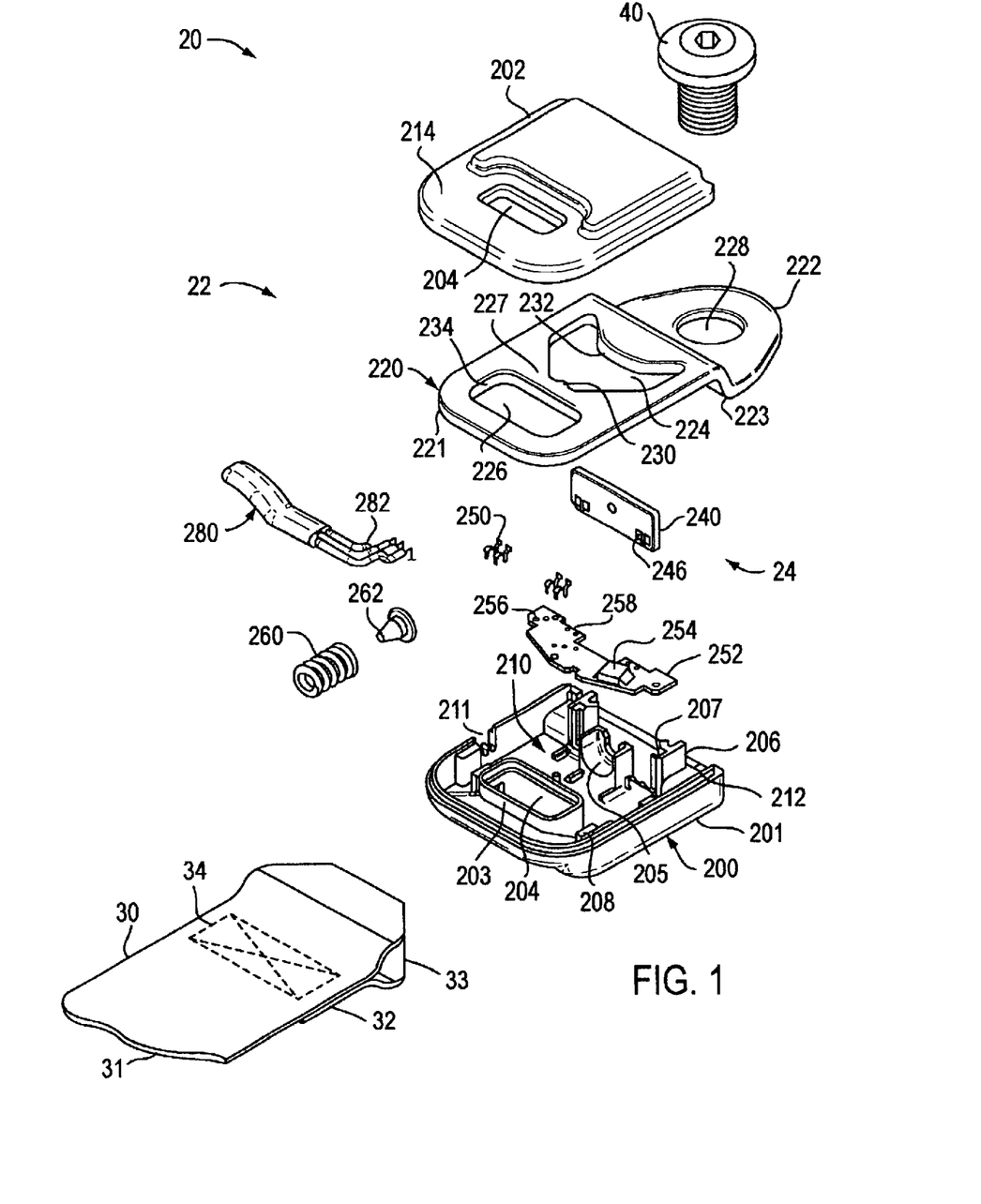
FIG. 1 is a perspective exploded view of a seat belt tension sensor.
Figure 2:
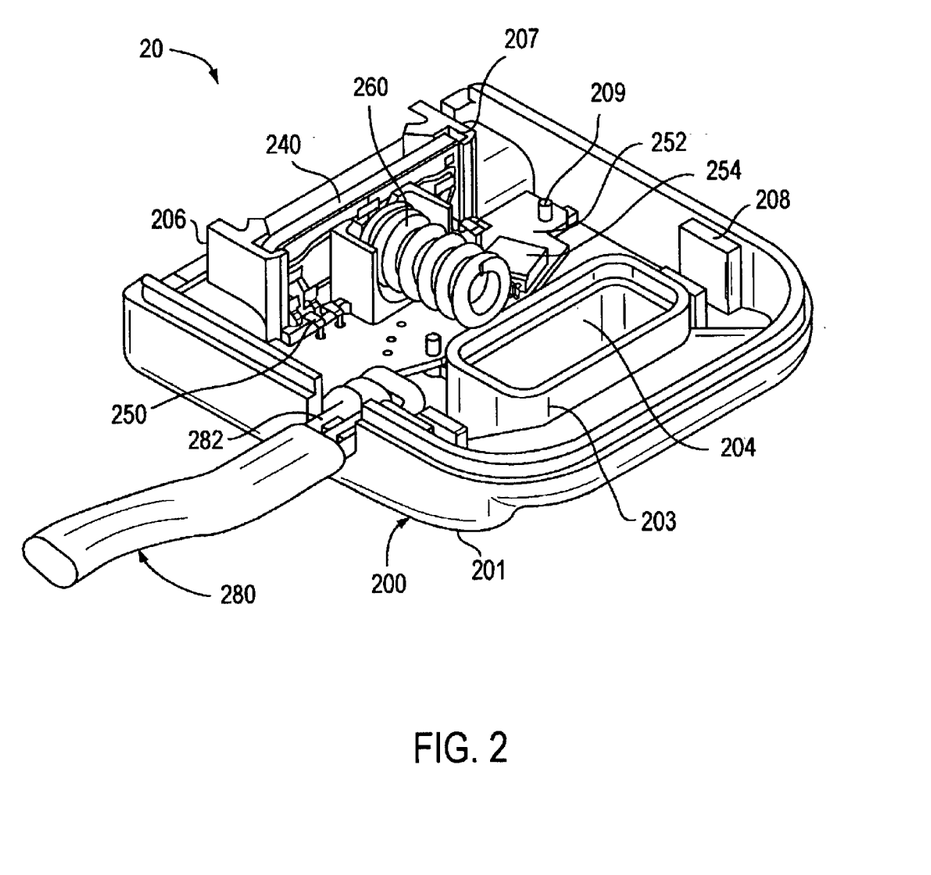
FIG. 2 is a partial assembled view of FIG. 1.
Figure 3:
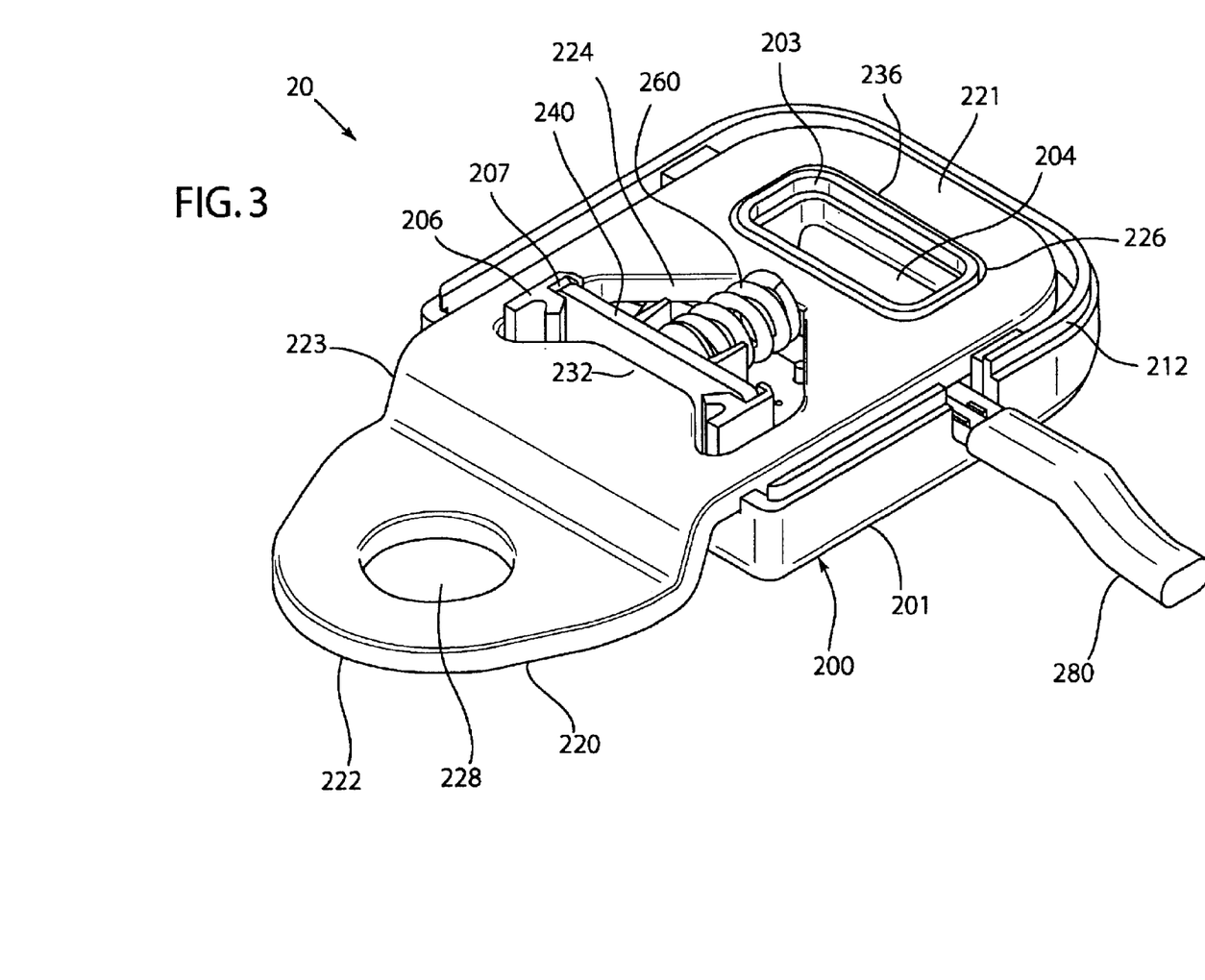
FIG. 3 is an assembled view of FIG. 1 with a portion of the housing removed.
Figure 4:
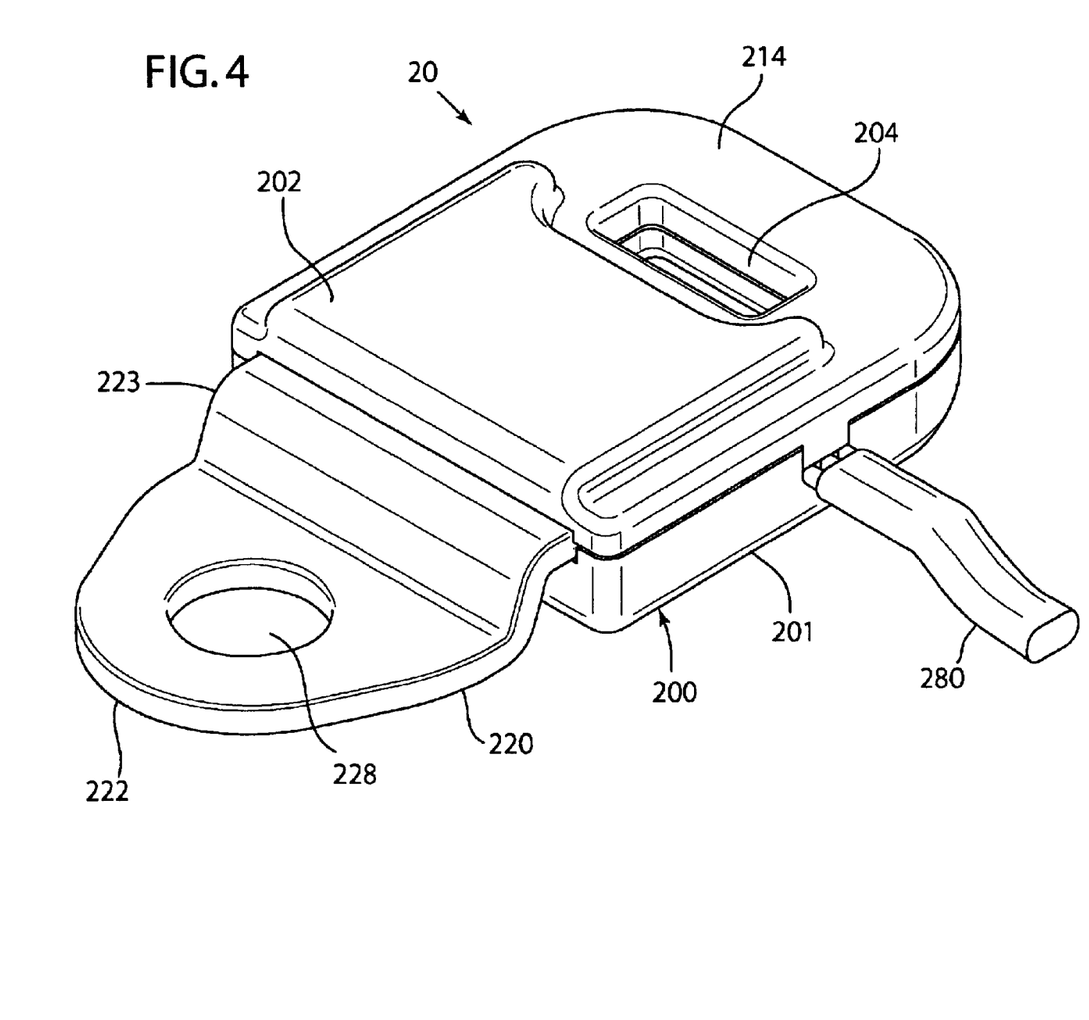
FIG. 4 is an assembled view of FIG. 1.

The limit structure 22 includes a housing 200, an anchor plate 220 and a strain sensor or member 240. Housing 200 has a bottom portion 201, top portion 202, flange 203, hole 204, spring channel 205 and posts 206. A cavity 210 is located within housing 200. Posts 206 have slots 207 that hold strain member 240. Housing 200 has a notch 211, pylons 208, pins 209 and an upwardly extending lip 212. Housing 200 has a narrow portion 214 on an end of the housing.

Anchor plate 220 is loosely fitted within housing 200 resting on pylons 208. Anchor plate 220 includes ends 221 and 222, a step section 223, a cutout 224, aperture 226 and an aperture 228. Arm 227 extends between aperture 226 and cutout 224. A projection 230 extends from arm 227 into cutout 224. A fin 232 extends into cutout 224. The anchor plate 220 is located in cavity 210. Aperture 226 goes over and surrounds flange 203. A gap 236 is formed between flange 203 and edge 234

Seat belt webbing 30 is attached through hole 204 and aperture 226. The end 32 of webbing 30 is routed through hole 204 and aperture 226, wrapped back onto itself forming loop 33 and sewn with stitching 34 to secure the seat belt webbing to assembly 20.

A spring 260 is mounted in spring channel 205. One end of spring 260 is mounted over projection 230. Sensor 24 has a strain member 240 that is mounted in slots 207. A support 262 fits into one end of spring 260. Support 262 rests adjacent a surface of strain member 240 and serves to focus the forces from spring 260 onto strain member 240. Fin 232 is in contact with the back surface of strain member 240.

A wire harness 280 has several wires 282. Wires 282 are pressed or soldered into circuit board holes 256 in printed circuit board 252.

The top portion 202 of the housing 200 is attached to the bottom portion 201 by ultrasonic welding along lip 212.

Figure 5:
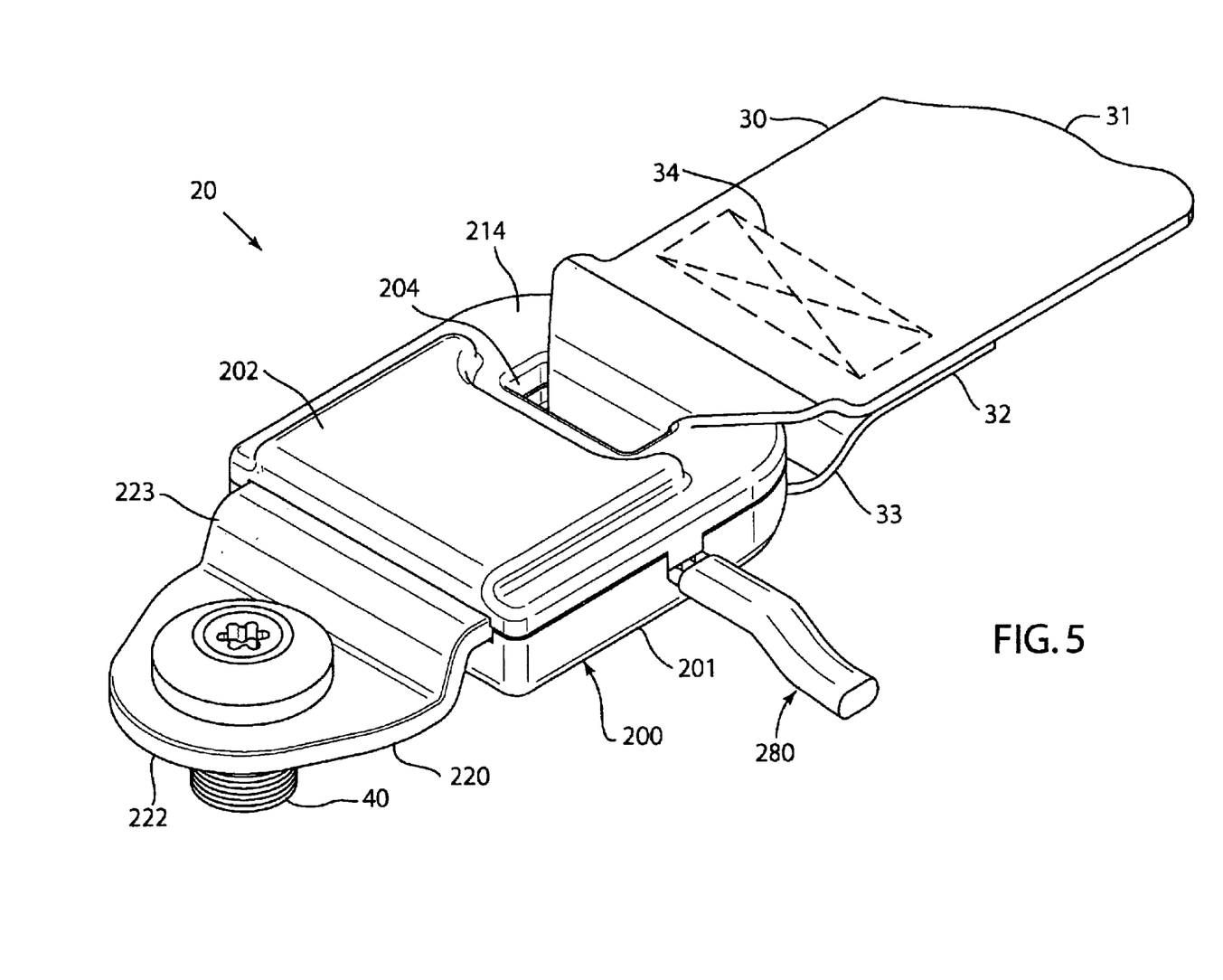
FIG. 5 is an assembled view including the belt and fastener.
Figure 6:
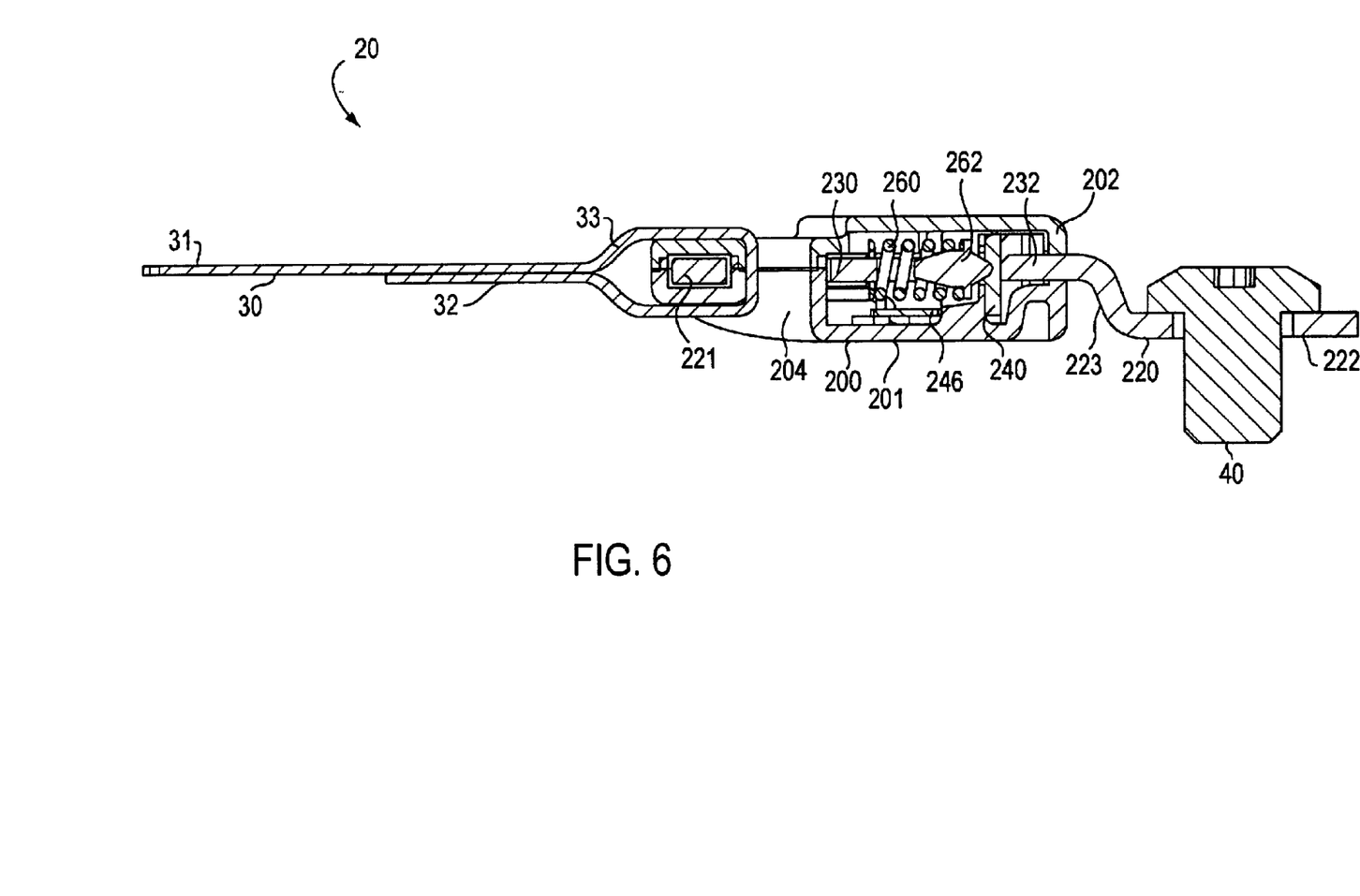
FIG. 6 is a cross-sectional view of FIG. 5.

Seat belt tension sensor 20 is attached to a vehicle floor or seat or other member (not shown) by a fastener 40 such as a bolt, rivet or screw. Fastener 40 goes through aperture 228 and is attached to a vehicle structure or seat. The fastener shown is threaded; however, other types of fasteners would work such as a rivet.

Figure 7:
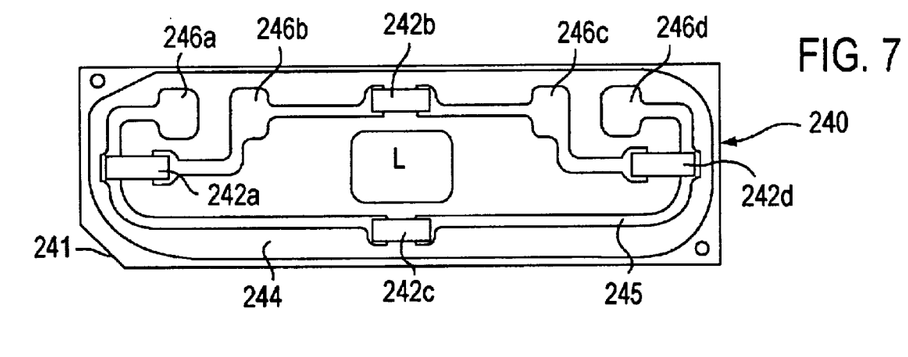
FIG. 7 is a side view of the strain member.
Figure 8:
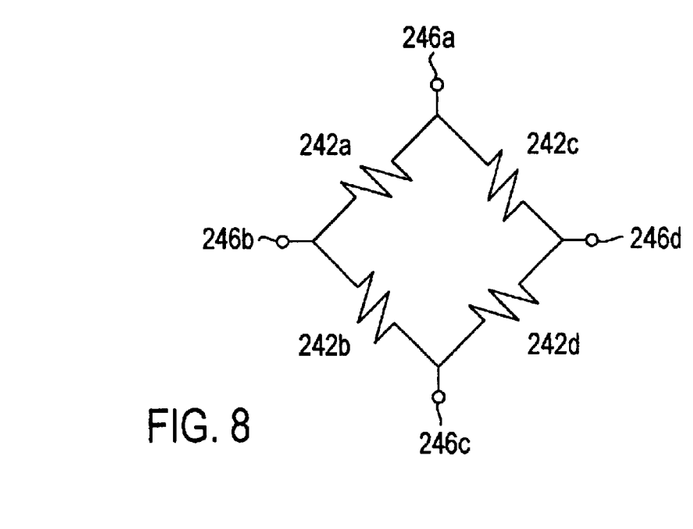
FIG. 8 is a schematic diagram of the wheatstone bridge circuit.

Strain member 240, shown in FIGS. 7 and 8, is formed of a material capable of supporting the tension applied by spring 260 and actuator 262 when the seat belt is tightened. Preferably, the strain member 240 is formed of 430 stainless steel. The strain member 240 includes strain sensitive resistors 242a,b,c,d formed thereon. These are formed by first depositing a dielectric layer 244 onto a substrate 241. Substrate 241 is preferably steel. The strain member 240 is then kiln fired at 850° C. Next, electrically conductive traces 245 and connector pads 246a,b,c,d are similarly deposited onto the strain member 240. The strain member 240 is again kiln fired at 850° C. The strain sensitive resistors 242a,b,c,d are next screened onto the strain member 240 in positions defined by the electrically conductive traces 245. The strain member 240 is again kiln fired at 850° C. At this point, a final coating of a covercoat or epoxy (not shown) can be applied to protect the electrical components of strain member 240. This coating is not required, but may be desirable in circumstances where high abrasion or contaminants are expected. It should be noted that the strain sensitive resistors 242a,b,c,d and connector pads 246a,b,c,d together form the Wheatstone bridge circuit of FIG. 8.

Details of the construction and operation of resistors 242 are shown in U.S. patent application Ser. No. 09/441,350, filed Nov. 15, 1999 and titled, "Automobile Seat Having Seat Supporting Brackets with a Stepped Weight Sensor".

Terminals 250 connect to strain member 240 and are soldered to pads 246a, b, c, d. Terminals 250 have one end that are soldered in holes 258 of printed circuit board 252. Electronic circuitry 254, such as an integrated circuit is attached to printed circuit board 252 to amplify and filter the signal from the strain gage resistors 242. Printed circuit board 252 has holes that fit over pins 209 in housing 200. Circuit board 252 is held in position in cavity 210 by pins 209.

When a tension is applied to seat belt 30, housing 200 transfers force to posts 206 which applies pressure to the ends of strain member 240. The spring force of spring 260 resists this force in the center of strain member 240 causing strain in member 240. As the tension increases, the strain sensitive resistors 242 will change resistance resulting in an electrical output signal that changes in proportion to the amount of tension in seat belt 30. This electrical signal is processed by electronic circuitry 254 and provided to an external electrical circuit by wire harness 280.

In a collision situation, a large force is applied to the tension sensor. The force applied to the seat belt overcomes the spring resistance of spring 260 moving housing 200 and flange 203 into contact with anchor plate 220. In this case, edge 234 is in contact with flange 203. The large force from the seat belt is transferred through the anchor plate 220 to fastener 40, which is attached to the vehicle structure or seat. Thus, in a collision, the large seat belt tension force is transferred from the seat belt to the vehicle structure. In this way, no further tension is applied to the strain member 240 and the strain member 240 is thus protected from excessive damaging forces by limit structure 22.

An electrical output signal is generated by the resistors 242 that is proportional to the magnitude of the tension in the seat belt and is transmitted over a wire harness 280 to a conventional air bag controller or occupant classification module (not shown). The air bag controller can then use the seat belt tension information to compute a more accurate profile of the seat occupant and use that information to control deployment of the airbag. This is the normal operational state of the seat belt tension sensor in which all of the seat belt tension is carried through the sensor 20.

In a situation where the vehicle is involved in a crash, the seat belt tension sensor operates in a different mode called a high load or crash state. In the high load state, the limit structure 22 carries the majority of tension placed on the seat belt. The amount of tension in the seat belt in a crash situation is much larger than in normal operation. If the strain member 240 was designed to carry all of this tension, it would not flex enough to properly function as a strain gage sensor. Therefore, in a crash situation, the limit structure 22 carries the tension through the much stronger limit structure 22.

Remarks

The seat belt tension sensor has several advantages. It allows accurate sensing of seat belt tension, while at the same time providing the structural strength needed for occupant restraint in a crash situation. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

The gap between the anchor plate and the housing flange is the travel range of the sensor as it is actuated. This design solves several problems.

1) Maintaining Sensitivity at Low Loads Without Damage at Higher Loads.

When the gap between the edge and the flange is closed the load applied to the strain sensor elements reaches its limit. After this, the load is transferred to the fastener. Limiting the maximum load applied to the strain sensor is necessary since the working range of the sensor is generally below 100-lbs. but the sensor must withstand large (often greater than 1000-lb.) loads without damage and must not compromise the integrity of the passenger restraint system.

2) Maintaining Restraint System Integrity.

The present design allows the use of the same or very similar mounting bolts and anchors and mounting technique as do current seatbelt attachment methods. Thus, safety engineers are very familiar with the requirements of the attachment method and installation procedures are changed as little as possible.

3) Integration Into Multiple Restraint Systems.

This present invention allows the sensor to be attached at the most common point of a wide variety of belt systems. It is useable even with very short bolt to seat belt buckle distances.

Variations

The sensor shown had several strain gage resistors, one skilled in the art will realize that the preferred embodiment would work with other types of sensors. For example, discrete chip resistors could be attached or foil type strain gages could be used.

Another variation of the seat belt tension sensor would be to utilize other electrical connections other than a wire harness. For example, a integral connector or terminals could be added.

The seat belt tension sensor shown was mounted between a seat belt and a vehicle structure. One skilled in the art will realize that the preferred embodiment could be mounted to various locations on the seat or vehicle interior. For example, the seat belt tension sensor could be attached to the upper or lower B pillar or at the seat frame.

The illustrated embodiment showed the use of the seat belt tension sensor in an automobile seat. It is contemplated to utilize the seat belt tension sensor in other occupant sensing applications such as chairs, sofas, scales, beds and mattresses, hospital equipment, cribs, airplane seats, train seats, boat seats, amusement rides, and theater seats.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor for attachment between a seat belt and a vehicle structure comprising:
    a housing having a cavity;
    an anchor plate having a first portion located in the cavity, the housing movable relative to the anchor plate between a first position and a second position;
    a strain gage sensor mounted to the housing, such that the housing presses on the sensor as the housing moves from the first to the second position, the sensor generating an electrical signal in response to the housing moving between the first and second positions, the electrical signal changing as a function of tension on the seat belt;
    a spring located between the sensor and the anchor plate, the spring urging the housing toward the first position, wherein the housing has a flange with a hole extending through the flange adapted to receive a seat belt loop and the anchor plate has a corresponding aperture for receiving the flange.

2. The seat belt tension sensor according to claim 1 wherein the anchor plate has a second portion extending outside of the housing, the second portion defining a second aperture for receiving a fastener mountable to a vehicle structure.

3. The seat belt tension sensor according to claim 1 wherein the housing has a pair of posts extending therefrom, the sensor being retained in the posts.

4. The seat belt tension sensor according to claim 1 wherein the anchor plate has a cutout, the sensor and the spring extending into the cutout.

5. The seat belt tension sensor according to claim 1 wherein a wire harness is attached to the sensor.

6. The seat belt tension sensor according to claim 1 wherein the anchor plate has a projection that extends into the spring.

7. The seat belt tension sensor according to claim 1 wherein the housing has a narrow portion adjacent the hole that an end of the seat belt wraps around.

8. The seat belt tension sensor according to claim 1 wherein the strain gage sensor is a substrate having at least one resistor mounted thereon.

9. The seat belt tension sensor according to claim 8, wherein the substrate has a first surface and a second surfaces, the resistor mounted on the first surface and the spring in contact with the second surface.

10. The seat belt tension sensor according to claim 1 wherein the sensor includes four resistors.

11. The seat belt tension sensor according to claim 1 wherein the sensor includes resistors are connected to form a wheatstone bridge.

12. A seat belt tension sensor for measuring the amount of tension in a seat belt in a vehicle comprising:
    a housing, the seat belt attached to the housing;
    an anchor plate having a first end mounted to the housing and a second end adapted for mounting to a vehicle structure;
    a strain gage sensor mounted to the housing, the sensor adapted to provide an electrical signal indicative of the tension in the seat belt; and
    a spring mounted between the sensor and the anchor plate;
    the housing movable relative to the anchor plate as tension is placed on the seat belt such that the tension of the seat belt is transferred to the sensor where it is detectable.

13. The seat belt tension sensor according to claim 12 wherein the housing has a flange, the flange contacting the anchor plate after a first magnitude of tension in the seat belt is exceeded.

14. The seat belt tension sensor according to claim 13 wherein the amount of strain transferred from the seat belt to the sensor is limited to the first magnitude of tension.

15. The seat belt tension sensor according to claim 13 wherein the flange contacting the anchor plate protects the sensor from damage.

16. The seat belt tension sensor according to claim 12 wherein the housing defines a flange and the anchor plate defines an aperture receiving the flange such that a gap is defined between the flange and the anchor plate within the aperture and wherein the anchor plate defines a cutout for receiving the sensor and the spring.

17. The seat belt tension sensor according to claim 12 wherein, the second end is adapted to receive a fastener.

18. The seat belt tension sensor according to claim 12 wherein the housing has a pair of posts extending therefrom, each post having a slot, the sensor retained in the slots.

19. The seat belt tension sensor according to claim 12 wherein the anchor plate defines a projection, the spring mounted over the projection.

20. The seat belt tension sensor according to claim 16, wherein the flange has a hole for receiving a seat belt webbing.

21. The seat belt tension sensor according to claim 12, wherein the housing has a narrow portion adjacent the flange that the seat belt wraps around.

22. The seat belt tension sensor according to claim 12 wherein the strain gage is a substrate having at least one resistor mounted thereon.

23. The seat belt tension sensor according to claim 22, wherein the substrate has a first surface and a second surface, the resistor mounted on the first surface and the spring in contact with the first surface.

24. The seat belt tension sensor according to claim 12, wherein a printed circuit board is mounted in the housing.

25. The seat belt tension sensor according to claim 24, wherein a terminal connects the strain member to the printed circuit board.

26. The seat belt tension sensor according to claim 24 wherein a wire harness is connected to the printed circuit board.

27. The seat belt tension sensor according to claim 24 wherein an electronic circuit is mounted to the printed circuit board, the electronic circuit adapted to amplify the electrical signal.

28. The seat belt tension sensor according to claim 23, wherein the anchor plate is contact with the second surface.

29. A seat belt tension sensor suitable for use with a vehicle connection bolt, the device comprising:

an apertured anchor plate having a first end defining a first opening for securing a seat belt webbing and having a second end defining a second opening for the bolt, a housing slidably mounted around the first end, the housing defining a hole and a flange around the hole extending into the first opening, whereby the flange, the hole and the first opening are together adapted to receive a seat belt webbing;

a strain gage secured within the housing;

a spring set between the anchor plate and the strain gage such that the strain gage is responsive to a force applied by the seat belt webbing to the housing.

30. The seat belt tension sensor device according to claim 29 further comprising an actuator support set between the spring and the strain gage to actuate the strain gage.

31. The seat belt tension sensing device according to claim 29 wherein the housing includes a channel for receiving the spring.

32. The seat belt tension sensing device according to claim 29 wherein the first opening in the anchor plate is sized to provide limited sliding motion of the housing with respect to the anchor plate.

33. A seat belt tension sensor suitable for use with a vehicle connection bolt, the device comprising:

an apertured anchor plate having a first end portion defining a first opening and having a second end portion defining a second opening for the bolt, the anchor plate further defining a cutout having a pair of opposing portions;

a housing slidably mounted around the first end, the housing defining a hole and a flange around the hole, the flange extending into the first opening, whereby the flange, the hole and the first opening are together adapted to secure a seat belt webbing;

a spring set between the pair of opposing portions;

a strain gage secured to the housing and positioned between one of the opposing portions and the spring such that the strain gage is responsive to a force applied by the seat belt webbing to the housing, whereby the flange extending into the first opening serves to limit the sliding motion of the housing such that the housing is movable from positions in which increasing force of seat belt tension is detectable by the strain gage and a limit position in which increasing force of seat belt tension is countered by the anchor plate.

34. The seat belt tension sensor according to claim 33 wherein the cutout is defined between the first and second openings.

35. The seat belt tension sensor according to claim 33 wherein the opposing portions are opposing sides of an opening defined by the anchor plate and wherein at least one of the opposing portions includes a projection into the opening in the plane of the anchor plate for connection to the spring.

36. The seat belt tension sensing according to claim 33 further comprising an actuator support set between the spring and the strain gage to actuate the strain gage.

37. The seat belt tension sensing according to claim 33 wherein the housing defines a guide channel for receiving the spring.

* * * * *